US012238004B2

(12) United States Patent
Khare et al.

(10) Patent No.: US 12,238,004 B2
(45) Date of Patent: Feb. 25, 2025

(54) ACTIVE BACKUP PATH MANAGEMENT FOR MULTI-REGION AND MULTI-CLOUD APPLICATIONS

(71) Applicant: Prosimo Inc, San Jose, CA (US)

(72) Inventors: Mohil Khare, San Jose, CA (US); Sidhesh Manohar Divekar, Milpitas, CA (US); Arunabha Sunil Saha, Fremont, CA (US)

(73) Assignee: Prosimo Inc., San Jose, CA (US)

( * ) Notice: Subject to any disclaimer, the term of this patent is extended or adjusted under 35 U.S.C. 154(b) by 3 days.

(21) Appl. No.: 18/295,014

(22) Filed: Apr. 3, 2023

(65) Prior Publication Data

US 2024/0333643 A1    Oct. 3, 2024

(51) Int. Cl.
*H04L 45/74* (2022.01)
*H04L 45/00* (2022.01)
*H04L 61/4511* (2022.01)

(52) U.S. Cl.
CPC .............. *H04L 45/74* (2013.01); *H04L 45/22* (2013.01); *H04L 61/4511* (2022.05)

(58) Field of Classification Search
CPC ..... H04L 41/0668; H04L 45/22; H04L 45/74; H04L 61/4511; H04L 69/40
See application file for complete search history.

(56) References Cited

U.S. PATENT DOCUMENTS

| | | | |
|---|---|---|---|
| 2017/0060708 A1* | 3/2017 | Narang | G06F 11/2033 |
| 2018/0062914 A1* | 3/2018 | Boutros | H04L 45/28 |
| 2021/0195465 A1* | 6/2021 | Behrens | H04L 67/52 |
| 2022/0200892 A1* | 6/2022 | Pandey | H04L 45/121 |
| 2022/0200954 A1* | 6/2022 | Divekar | H04L 45/85 |
| 2022/0200957 A1* | 6/2022 | Prabagaran | H04L 45/74 |
| 2022/0255822 A1* | 8/2022 | Yousouf | H04L 41/046 |
| 2022/0417147 A1* | 12/2022 | Woodworth | H04L 45/12 |
| 2024/0061751 A1* | 2/2024 | Janarthanam | G06F 11/2097 |
| 2024/0330100 A1* | 10/2024 | Zafer | G06F 11/0709 |
| 2024/0333631 A1* | 10/2024 | Zafer | H04L 41/0654 |

* cited by examiner

*Primary Examiner* — Jeong S Park
(74) *Attorney, Agent, or Firm* — David R. Stevens; Stevens Law Group

(57) ABSTRACT

Edge clusters execute in a plurality of regional clouds of a cloud computing platforms, which may include cloud POPs. Edge clusters may be programmed to control access to applications executing in the cloud computing platform. Edge clusters and an intelligent routing module route traffic to applications executing in the cloud computing platform. Application instances accessed through different edge clusters may have a backup relationship managed by a health monitor that is external to the cloud computing platforms. The health monitor monitors accessibility of the application instances internally and externally relative to the cloud computing platforms and transitions the role of primary instance between the application instances by managing routing logic of the cloud computing platforms.

20 Claims, 13 Drawing Sheets

ACTIVE BACKUP PATH MANAGEMENT FOR MULTI-REGION AND MULTI-CLOUD APPLICATIONS

RELATED APPLICATION

This application is related to U.S. application Ser. No. 17/315,192 filed May 7, 2021, and entitled MANAGING ACCESS TO CLOUD-HOSTED APPLICATIONS USING DOMAIN NAME RESOLUTION, which is hereby incorporated herein by reference in its entirety.

FIELD OF THE INVENTION

The present invention relates generally to systems and methods for implementing backup and restoration for applications hosted on a cloud computing platform.

BACKGROUND OF THE INVENTION

Currently there is a trend to relocate applications, databases, and network services to cloud computing platforms. Cloud computing platforms relieve the user of the burden of acquiring, setting up, and managing hardware. Cloud computing platforms may provide access across the world, enabling an enterprise to operate throughout the world without needing a physical footprint at any particular location. The diverse environments and locations of applications make tasks such as performing backup and restoration difficult to manage.

It would be an advancement in the art to implement an improved solution for providing backup and restoration of applications hosted in a cloud computing platform.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
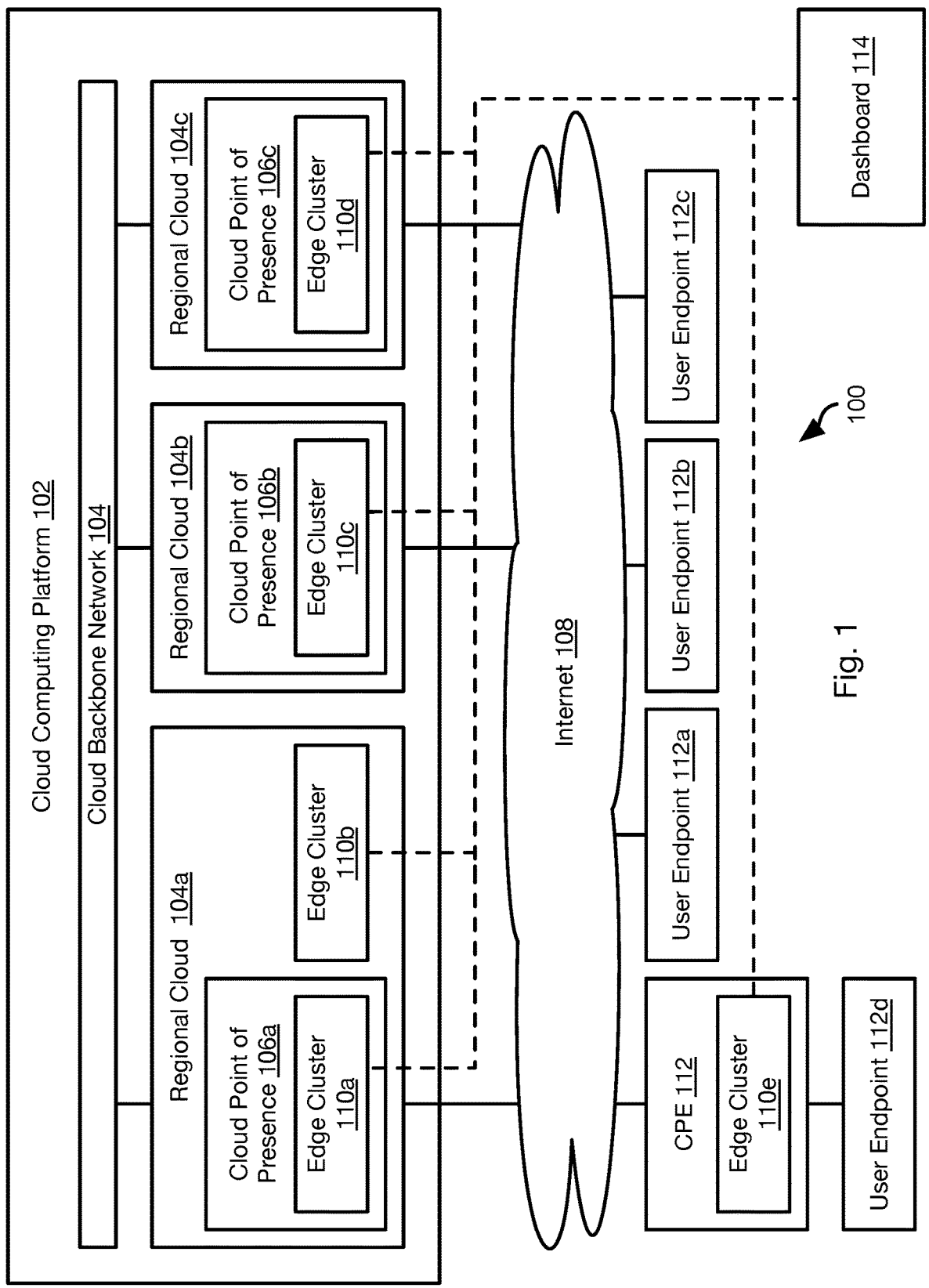
FIG. 1 is a schematic block diagram of a network environment for managing access to cloud-based applications in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Referring to FIG. 1, a network environment may include one or more cloud computing platforms 102, such as AMAZON WEB SERVICES (AWS), MICROSOFT AZURE, GOOGLE CLOUD PLATFORM, or the like. As will be discussed below, multiple cloud computing platforms 102 from multiple providers may be used simultaneously. As known in the art, a cloud computing platform 102 may be embodied as a set of computing devices coupled to networking hardware and providing virtualized computing and storage resources such that a user may instantiate and execute applications, implement virtual networks, and allocate and access storage without awareness of the underling computing devices and network hardware. Each cloud computing platform 102 may implement some or all aspects of the cloud computing model described above. One or more of the cloud computing platforms 102 may be a public cloud providing cloud computing services to multiple entities for a fee. One or more of the cloud computing platforms 102 may also be a private cloud computing platform built and maintained on a premise of the entity utilizing the private cloud computing platform 102. In some implementations, systems and methods described herein may be implemented by a combination of one or more public private cloud computing platforms 102 and one or more private cloud computing platforms 102.

A cloud computing platform 102 from the same provider may be divided into different regional clouds, each regional cloud including a set of computing devices in or associated with a geographic region and connected by a regional network. These regional clouds may be connected to one another by a cloud backbone network 104. The cloud backbone network 104 may provide high throughput and low latency network connections for traffic among a plurality of regional clouds 104a-104c. The cloud backbone network 104 may include routers, switches, servers and/or other networking components connected by high capacity fiber optic networks, such as transoceanic fiber optic cables, the Internet backbone, or other high-speed network. Each regional cloud 104a-104c may include cloud computing devices and networking hardware located in and/or processing traffic from a particular geographic region, such as a country, state, continent, or other arbitrarily defined geographic region.

A regional cloud 104a-104c may include one or more points of presence (POPs) 106a-106c. For example, each regional cloud 104a-104c may include at least one POP 106a-106c. A cloud POP 106a-106c may be a physical location hosting physical network hardware that implements an interface with an external network, such as a wide area network (WAN) that is external to the cloud computing platform 102. The WAN may, for example, be the Internet 108. A WAN may further include a 5G Cellular Network and/or a LONG TERM EVOLUTION (LTE) cellular network.

For example, a high-speed, high-capacity network connection of an Internet service provider (ISP) may connect to the POP 106a-106c. For example, the network connection may be a T1 line, leased line, fiber optic cable, Fat Pipe, or other type of network connection. The POP 106a-106c may have a large amount of servers and networking equipment physically at the POP 106a-106c enabled to handle network traffic to and from the network connection and possibly providing computing and storage at the POP 106a-106c.

The POP 106a-106c therefore enables users to communicate with the cloud computing platform 102 very efficiently and with low latency. A cloud computing platform 102 may implement other entrance points from the Internet 108 in a particular regional cloud 104a-104c. However, a POP 106a-106c may be characterized as providing particularly low latency as compared to other entrance points.

Edge clusters 110a-110c may execute throughout a cloud computing platform 102. Edge clusters 110a-110c may operate as a cooperative fabric for providing authenticated access to applications and performing other functions as described herein below. Edge clusters 110a, 110c, 110d may be advantageously hosted at a cloud POP 106a-106c. Edge clusters 110b may also be implemented at another location within a cloud computing platform 102 other than a cloud POP 106a-106c. In some instances, one or more edge cluster 108e may also execute on customer premise equipment (CPE) 112. One or more edge cluster 108e on CPE 112 may be part of a fabric including one or more edge clusters 110a-110d executing in a cloud computing platform 102. Edge clusters 110a-110d on cloud computing platforms 102 of different providers may also form a single fabric functioning according to the functions described herein below.

Each edge cluster 110a-110e may be implemented as a cluster of cooperating instances of an application. For example, each edge cluster 110a-110e may be implemented as a KUBERNETES cluster managed by a KUBERNETES master, such that the cluster includes one or pods, each pod managing one or more containers each executing an application instance implementing an edge cluster 110a-110e as described herein below. As known in the art, a KUBERNETES provide a platform for instantiating, recovering, load balancing, scaling up, and scaling down, an application including multiple application instances. Accordingly, the functions of an edge cluster 110a-110c as described herein may be implemented by multiple application instances with management and scaling up and scaling down of the number of application instances being managed by a KUBERNETES master or other orchestration platform.

Users of a fabric implemented for an enterprise may connect to the edge clusters 110a-110e from endpoints 112a-112d, each endpoint being any of a smartphone, tablet computer, laptop computer, desktop computer, or other computing device. Devices 110a-110a may connect to the edge clusters 110a-110e by way of the Internet or a local area network (LAN) in the case of an edge cluster hosted on CPE 112.

Coordination of the functions of the edge clusters 110a-110e to operate as a fabric may be managed by a dashboard 114. The dashboard 114 may provide an interface for configuring the edge clusters 110a-110e and monitoring functioning of the edge clusters 110a-110e. Edge clusters 110a-110e may also communicate directly to one another in order to exchange configuration information and to route traffic through the fabric implemented by the edge clusters 110a-110e.

In the following description, the following conventions may be understood: reference to a specific entity (POP 106a, edge cluster 110a, endpoint 112a) shall be understood to be applicable to any other instances of that entity (POPs 106b-106c, edge clusters 110b-110e, endpoints 112b-112d). Likewise, examples referring to interaction between an entity and another entity (e.g., an edge cluster 110a and an endpoint 112a, an edge cluster 110a and another edge cluster 110b, etc.) shall be understood to be applicable to any other pair of entities having the same type or types. Unless specifically ascribed to an edge cluster 110a-110e or other entity, the entity implementing the systems and methods described herein shall be understood to be the dashboard 114 and the computing device or cloud computing platform 102 hosting the dashboard 114.

Although a single cloud computing platform 102 is shown, there may be multiple cloud computing platforms 102, each with a cloud backbone network 104 and one or more regional clouds 104a-104c. Edge clusters 110a-110e may be instantiated across these multiple cloud computing platforms and communicate with one another to perform cross-platform routing of access requests and implementation of a unified security policy across multiple cloud computing platforms 102.

Where multiple cloud computing platforms 102 are used, a multi-cloud backbone 104 may be understood to be defined as routing across the cloud backbone networks 104 of multiple cloud computing platforms 102 with hops between cloud computing platforms being performed over the Internet 108 or other WAN that is not part of the cloud computing platforms 102. Hops may be made short, e.g., no more than 50 km, in order to reduce latency. As used herein, reference to routing traffic over a cloud backbone network 104 may be understood to be implementable in the same manner over a multi-cloud backbone as described above.

Figure 2:
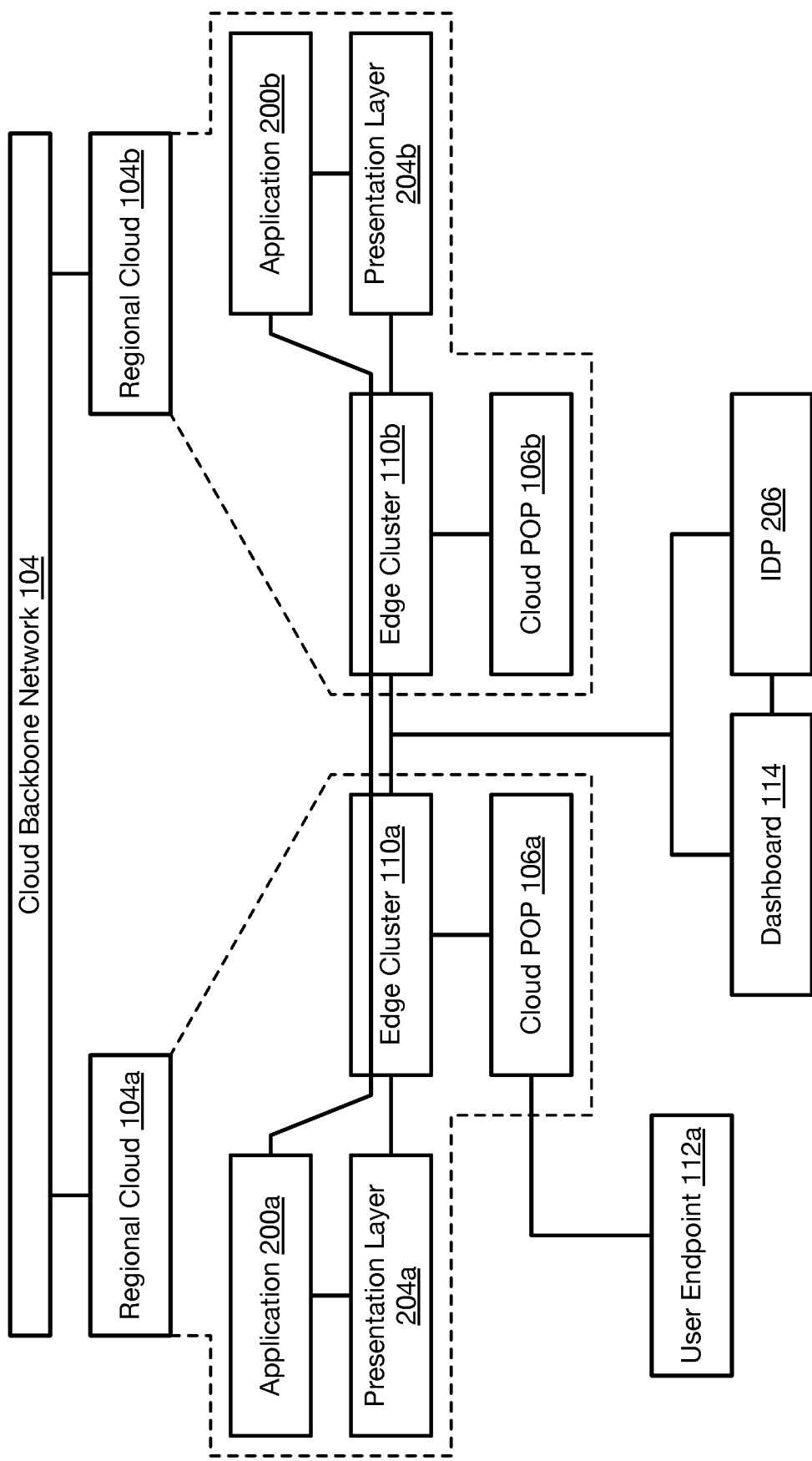
FIG. 2 is a schematic block diagram of components for managing access to cloud-based applications in accordance with an embodiment of the present invention.

FIG. 2 illustrates an example approach for managing application instances 200a-200b of an enterprise that are managed by a fabric implemented by a fabric including edge clusters 110a, 110b. Each edge cluster 110a, 110b may be in a different regional cloud 104a, 104b of a cloud computing platform 102, each regional cloud 104a, 104b being connected to the cloud backbone network 104 of that cloud computing platform 102. In the illustrated example, each edge cluster 110a, 110b executes within a cloud POP 106a, 106b of each regional cloud 104a, 104b, respectively. In other implementations, one or both of the edge clusters 110a, 110b is not executing within the cloud POP 106a, 106b of the regional cloud 104a, 104b by which it is executed.

Each application instance 200a, 200b may have a corresponding presentation layer 204a, 204b. The presentation layer 204a, 204b may, for example, be a web interface by which an interface to the application instance 200a, 200b is generated and transmitted to a user endpoint 112a and by which interactions received from the user endpoint 112a are received and processed by the application instance 200a, 200b. The presentation layer 204a, 204b may also be a graphical user interface (GUI) native to a computing platform simulated b the cloud computing platform 102, the GUI being transmitted to the endpoint 112a and interactions with the GUI being received from the user endpoint 112a and submitted to the application instance 200a, 200b by the GUI. In yet another alternative, the presentation layer 204a, 204b is a module programmed to communicate with a client executing on the user endpoint 112a in order to transmit information to the endpoint 112a and receive user interactions from the user endpoint 112a.

The edge clusters 110a, 110b may act as a gateway to the presentation layers 204a, 204b and provide access to the presentation layers 204a, 204b only to authenticated users. An example approach implemented by the edge clusters 110a, 110b is described below with respect to FIG. 3. The edge clusters 110a, 110b may be configured by the dashboard 114. The dashboard 114 may incorporate or cooperate with an identity provider (IDP) 206 such as OKTA, ONELOGIN, CENTRIFY, EMPOWERID, OPTIMAL IDM, BITIUM, LAST PASS, and PINGIDENTITY. Alternatively, the IDP 206 may be a cloud provider or a vendor providing virtual machines (e.g., VMWARE) within which the edge clusters 110a, 110b and application instances 200a, 200b are executing.

As shown in FIG. 2, application instances 200a, 200b may communicate with one another as part of their functionality. In some instances, this communication may be routed by way of the edge clusters 110a, 110b of the fabric managing the application instances 200a, 200b.

Figure 3:
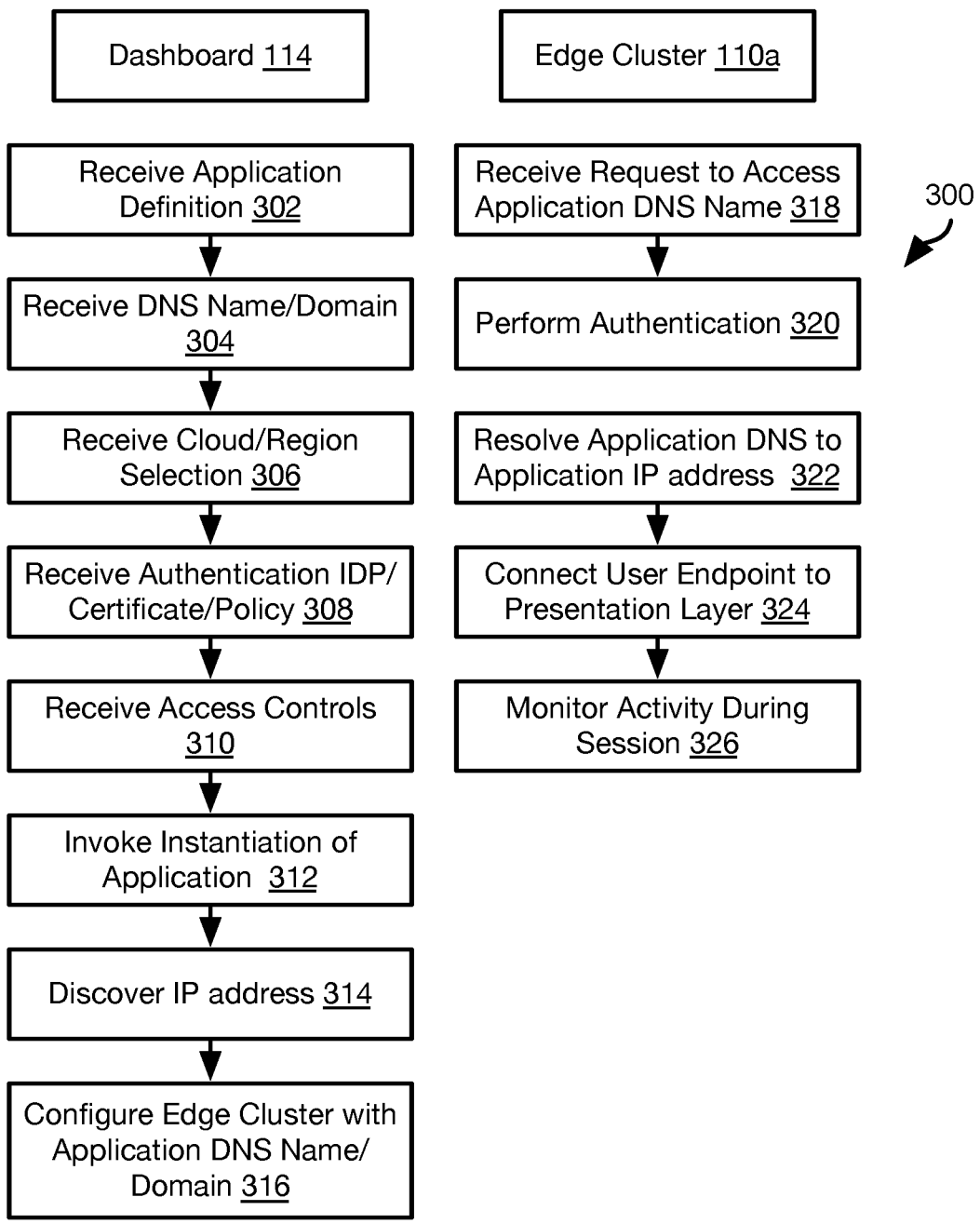
FIG. 3 is a process flow diagram of a method for performing managing access to an application using domain name resolution in accordance with an embodiment of the present invention.

Referring to FIG. 3, the instances of an application 200a, 200b (hereinafter only application instance 200a is discussed) may be instantiated and access thereto controlled using the illustrated method 300.

The method 300 may include receiving 302, such as by the dashboard 114, an application definition. The application definition may be received from an administrator, a script, or from another source. The application definition may specify an executable of which the application instance 200a will be an instance, configuration parameters for an instance of the executable, or other configuration information. The dashboard 114 may further receive 304 one or both of a name and a domain in a like manner. The name and/or domain may be according to a DNS (domain name service). As discussed in greater detail below, the dashboard 114 and edge clusters 110a-110e may implement DNS internal to the fabric managed by the edge clusters 110a-110e. Accordingly, the DNS may manage mapping of names and domains to actual addresses, e.g. IP addresses, of application instances in one or more cloud computing platforms 102 and one or more regional clouds 104a, 104b of one or more cloud computing platforms 102.

The method 300 may include receiving 306 selection of a cloud computing platform 102 and possibly selection of a particular regional cloud 104a, 104b, e.g. California, USA regional cloud for the AWS cloud computing platform 102. The selection of step 306 may be received from an administrator, read from a configuration script, or received from another source. In some implementations, this step is omitted and the dashboard 114 automatically selects a cloud computing platform 102 and possibly a regional cloud 104a, 104b. In yet another alternative, only a cloud computing platform 102 is selected and the cloud computing platform 102 automatically selects a regional cloud 104a, 104b.

The method 300 may include receiving 308 a definition of some or all of an IDP 206 to use for controlling access to the application instance 200a, an authentication certificate associated with the application instance 200a for use in authenticating users with the application instance 200a, and an authentication policy governing access to the application instance 200a (e.g., user accounts, groups, or the like that may access the application instance 200a). The information of step 308 may be received from an administrator, read from a configuration script, or received from another source.

The method 300 may include receiving 310 access controls. The access controls may be received from an administrator, read from a configuration script, or received from another source. The access controls may include some or all of time-based limitations (times of day, days of the week, etc. during which the application instance 200a may be accessed), location-based limitations (locations from which endpoints 110a-110d may access the application instance), a requirement for two-factor authentication, etc., or other type of access control.

The method 300 may further include invoking 312 instantiating an instance of the executable specified at step 302 as the application instance 200a in the cloud computing platform 102, and possibly regional cloud, specified at step 306. For example, the cloud computing platform 102 may provide an interface for instantiating application instances on virtualized computing resources. Accordingly, step 312 may include invoking this functionality to cause the cloud computing platform 102 or other tool to instantiate an application instance 200a. In some embodiments, the application instance 200a already exists such that step 312 is omitted and one or more edge clusters 110a-110e are configured to manage access to the application instance 200a.

The method 300 may include discovering 314 an internet protocol (IP) address of the application instance 200a. For example, in response to an instruction to create the application instance 200a, the cloud computing platform 102 may create the application instance 200a and assign an IP address to the application instance 200a. The cloud computing platform 102 may then return the IP address to the entity that requested instantiation, which may be the dashboard 114 in the illustrated example.

The method 300 may further include the dashboard 114 configuring 316 one or more edge clusters 110a-110e of the fabric to manage access to the application instance 200a. This may include storing a link between the name and/or domain from step 304 with the IP address from step 314 by the DNS. In some embodiments, the name and/or domain from step 304 may be distributed to endpoints 110a-110e whereas the IP address is not. Accordingly, the edge clusters 110a-110e may function as DNS servers and further control access to the application instance 200a by refraining from forwarding traffic to the IP address until a source of the traffic has been properly authenticated.

Step 316 may further include configuring one or more edge clusters 110a-110e of the fabric according to the authentication requirements of step 308 and the access controls of step 310. For example, one or more edge clusters 110a-110e may be programmed to condition allowance of a request to access the application instance 200a on some or all of (a) receiving confirmation from the specified IDP 206 that a source of the request is authenticated, (b) verifying a certificate submitted with the request according to a certificate received at step 308, (c) verifying that the request was received according to the access controls of step 310 (from a permitted location, at a permitted time, etc.).

An edge cluster 110a configured as described above with respect to step 316 may receive 318 a request to access the application instance 200a from an endpoint 112a, the request including the name and/or domain of the application instance 200a.

The edge cluster 110a may perform 320 authentication of the request and/or the endpoint 112a. This may include instructing the endpoint 112a to authenticate with the IDP 206 and receiving verification from the IDP 206 that the endpoint 112a is authenticated, such as authenticated for a particular user identifier. Step 320 may include authentication by another approach such as verification of a user identifier and password, verification of a certificate, or other authentication means.

If authentication is not successful at step 320, the remainder of the steps of the method 300 may be omitted and the request may be ignored, recorded, flagged as potentially malicious, or subject to other remedial action.

In response to successful authentication at step 320, the edge cluster 110a may resolve 322 the name and/or domain of the request to the IP address mapped to it at step 316 and connect 324 the user endpoint 112a to the application instance. Connection may include establishing a network connection to the application instance 200a. Th edge cluster 110a may implement network address translation (NAT) such that the IP address is not disclosed to the user endpoint 112a. Accordingly, a different IP address, such as the address of the edge cluster 110a, may be used as the destination of traffic sent by the user endpoint 112a and the edge cluster 110a may route the traffic to the IP address of the application instance 200a using NAT and forward the traffic to the application instance 200a.

In some embodiments, the edge cluster 110a may monitor 326 activities of the user endpoint 112a with respect to the application instance 200a and block further access in response to suspicious activity. Examples of suspicious activity may include access patterns that are different from past access by the endpoint 112a: access from a different country, a different time of day, an unusually high volume of traffic, or the like. The edge cluster 110a may therefore compile information of typical access patterns for the edge cluster 110a in order to detect anomalous access patterns.

Figure 4:
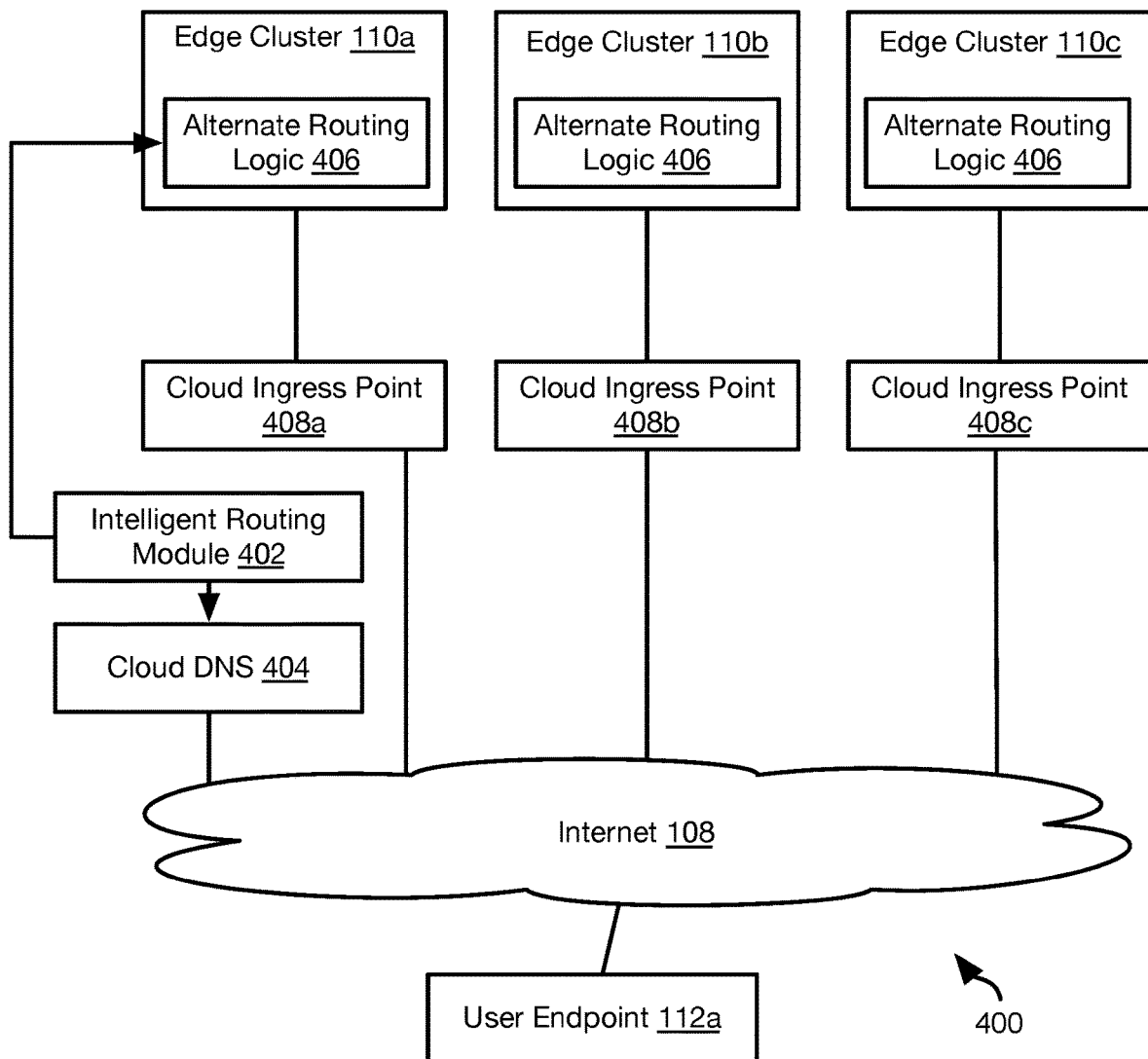
FIG. 4 is a schematic block diagram of components for performing domain name resolution in a cloud computing platform in accordance with an embodiment of the present invention.

FIG. 4 illustrates a system 400 that may be implemented by a fabric of edge clusters 110a-110c in a network environment, such as the network environment 100. In the illustrated system, an intelligent routing module 402 programs cloud DNS 404 of a cloud computing platform 102. The intelligent routing module 402 may be a component within the dashboard 114 or managed in response to user instructions input to the dashboard 114. The cloud DNS 404 may control the routing of traffic received from the user endpoint 112a among various ingress points 408a-408c of the cloud computing platform 102. The ingress points 408a-408c may include ingress points to different regional clouds and/or different ingress points to the same regional cloud.

A user endpoint 112a may transmit a request to a cloud computing platform 102 over the Internet 108. The request may be a request to access a resource name, such as in the form of a URL including a domain name and possibly one or more other items of information, such as a sub-domain, computer name, and possibly one or more other items of identifying information of a requested resource. The resource name may reference an application instance 200a and may include a name and domain configured for the application instance 200a as described above with respect to step 304 of the method 300.

The cloud DNS 404 may receive the request and resolve the resource name to an address, such as an IP address, assigned to one or more of the edge clusters 110a-110c implementing a fabric. The resolution by the cloud DNS 404 may be according to programming of the cloud DNS 404 by the intelligent routing module 402. Accordingly, a resource name may be associated by the intelligent routing module 402 to any edge cluster 110a-110e of a fabric. The cloud DNS 404 may implement Anycast DNS whereby the routing of a request is conditioned on a location of the user endpoint 112a that issued the request.

In some implementations, an edge cluster 110a-110c of a fabric may implement alternative routing logic 406. A request received by an edge cluster 110a may be evaluated according to the alternative routing logic 406, which may instruct the edge cluster 110a to instruct the endpoint 112a that generated the request to resubmit the request to a different edge cluster 110b. For example, the alternative routing logic 406 may transmit alternative service ("Alt-Svc") messages according to hypertext transport protocol (HTTP). In some implementations, the cloud DNS 404 may be incapable of fine-grained routing of requests. For example, there may be edge clusters 110a-110c at various geographic locations in a regional cloud whereas the cloud DNS 404 only enables a user to perform geographic name resolution to a single address within each regional cloud. Accordingly, the intelligent routing module 402 may program the cloud DNS to route requests to an edge cluster 110a in a regional cloud. The intelligent routing module 402 may further configure the alternative routing logic 406 of that edge cluster 110a to evaluate the location of user endpoints 112a and route requests from that user endpoint 112a to another edge cluster 110b in that regional cloud. For example, edge cluster 110b may be closer to the user endpoint 112a then the edge cluster 110a.

The system 400 may be used to perform arbitrary routing of traffic between a user endpoint 112a and any of the edge clusters 110a-110c. Various applications of the system 400 are described herein below.

For example, an edge cluster 110a-110e may be associated with the name and/or domain assigned to the application instance 200a in the cloud DNS 404 and/or alternative routing logic 406 such that requests addressed to the name and/or domain of the application instance 200a will be routed according to the static IP address or Anycast IP address of associated with the edge cluster 110a-110e for the application instance 200a. In another example, a request to resolve the name and/or domain of an application instance 200a may be resolved by the cloud DNS 404 and or alternative routing logic 406 to an IP address that may be a static IP address of a particular edge cluster 110a-110e or an Anycast IP address that could be resolved to one of multiple edge clusters 110a-110e.

The source of the resolution request may then transmit a request to the IP address returned to it, with the request being routed according to functionality associated with that IP address (static routing or Anycast routing).

Figure 5:
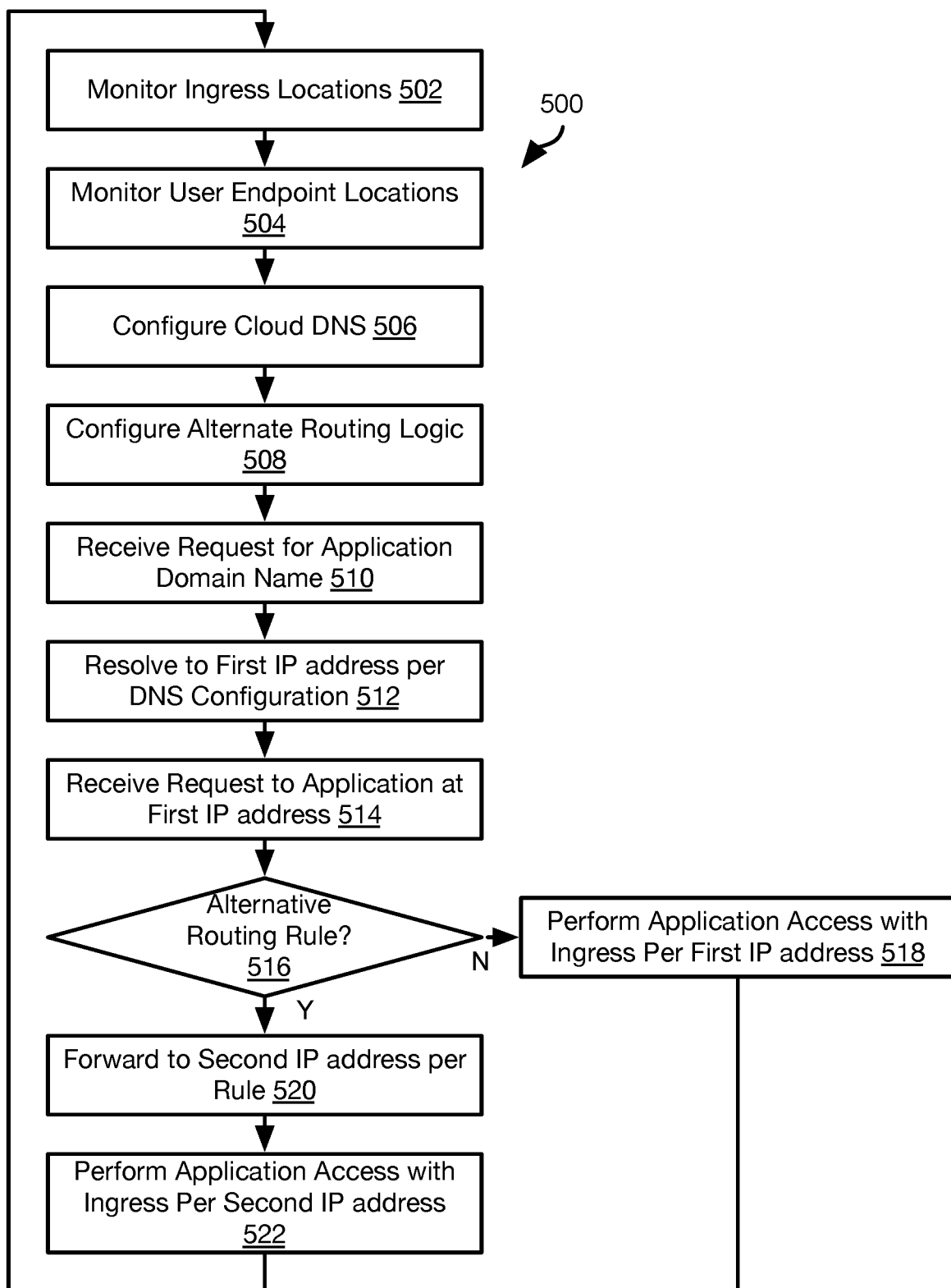
FIG. 5 is a process flow diagram of a method for performing domain name resolution in a cloud computing platform in accordance with an embodiment of the present invention.

FIG. 5 illustrates a method 500 of performing routing using the system 400. The method 500 may be performed by the intelligent routing module 402 and/or dashboard 114.

The method 500 may include monitoring 502 ingress locations. This may include tracking ingress locations 408a-408c of a cloud computing platform 102 at which requests from user endpoints 112a-112d are received. Monitoring 502 may include compiling statistics such as a frequency of requests for a given ingress points 408a-408c (requests per hour, minute, or other time interval) over time. The ingress point 408a-408c of requests may be detected due to reporting by the cloud computing platform 102, by the edge cluster 110a-110d that received a request recording an ingress point 408a-408c through which the request was received, or by some other means.

The method 500 may further include monitoring 504 the locations of user endpoints 112a-112d from which requests were received. The location of an endpoint 112a-112d at a time of generation of a request may be obtained by: inferring a location from a source IP address of the request, reading the location from a header included in the request, reading the location from an explicitly provided location value provided by the endpoint 112a-112d within the request. Monitoring 504 the locations may include some or all of compiling statistics for each location represented in received requests at varying degrees of specificity: requests from a country, from each state or province within the country, from each metropolitan area within the country, within each city within the country, etc. Statistics may be in the form of a frequency of requests (requests per day, hour, minute, or other time window) over time.

The method 500 may include configuring 506 the cloud DNS 404 and/or configuring 508 alternative routing logic 406 according to the data obtained from the monitoring steps 502, 504. Example approaches for configuring routing of requests for a fabric of edge cluster 110a-110e according to usage data are described below with respect to FIGS. 6 through 10B.

The method 500 may include receiving 510 an original request from user endpoint 112a to resolve a name and/or domain of the application instance 200a. The original request may be a domain resolution request or a request to access the application instance 200a including the name and/or domain. The original request may be received by the cloud DNS 404. In response to the programming of step 506, the cloud DNS 404 resolves 512 the name and/or domain to an IP address of an edge cluster, e.g., edge cluster 110a. The user endpoint 112a may receive this IP address from the cloud DNS 404 and transmit a second request to access the application instance 200a to the IP address of the edge cluster 110a. Alternatively, the cloud DNS 404 may forward the original request to the IP address.

Resolving 512 the domain name to an IP address may include using any of the approaches described above with respect to FIG. 4. These may include resolving the IP address to an Anycast IP address, resolving the IP address using geographic domain name service (GeoDNS) to a static or Anycast IP address, or resolving of the IP address to an Anycast IP address or static IP address followed by using alternative routing logic to redirect a request to an alternative edge cluster 110a-110e.

The edge cluster 110a receives 514 the request to access the application instance 200a (the original request forwarded by cloud DNS 404 or the second request from the user endpoint 112a). The edge cluster 110a may evaluated 516 whether there is alternative routing logic 406 applicable to the request. For example, the alternative routing logic may map a routing rule to one or both of the application instance 200a and one or more locations of user end points. Accordingly, step 516 may include determining whether the location of the user endpoint 112a and/or application instance 200a are referenced by a routing rule and if not, facilitates application access 518 through the edge cluster 110a. This may include routing traffic through an ingress point 408a-408c of the cloud computing platform associated with the edge cluster 110a, e.g. an ingress point 408a-408c determined according to programming of the cloud DNS 404. If so, the method 500 may include the edge cluster 110a forwarding 520 the request to a second IP address, e.g. the IP address of a second edge cluster 110b having a different ingress location to the cloud computing platform in the same or different regional cloud. Redirecting may include one or both of the edge cluster 110a forwarding the request to the second edge cluster 110b and the edge cluster 110a transmitting the second IP address of the second edge cluster 110b to the user endpoint 112a with an instruction to access the application instance 200a at the second IP address. The user endpoint 112a may thereafter perform 522 application access (e.g., send access requests to and receive responses from the application instance 200a) through an ingress 408a-408c corresponding to the second IP address, such has an ingress location 408a-408c that is physically closest to a computing device executing the second edge cluster 112b. Selection of the ingress location 408a-408c for a given IP address may be performed by the cloud DNS 404 or by other routing logic. For example, traffic addressed to the IP address may be routed by the Internet 108 to the ingress location 408a-408c according to DNS information provided to routing devices of the Internet 108 by the cloud computing platform 102.

Figures 6, 7:
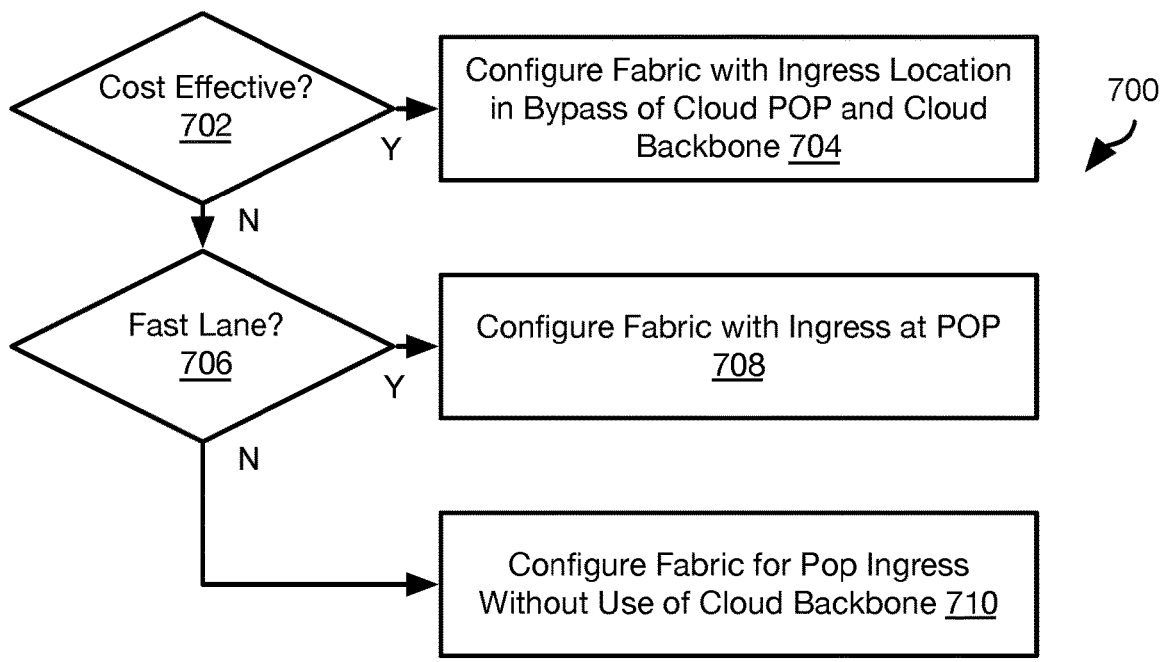
FIG. 6 is a table illustrating different routing options with respect to a cloud computing platform in accordance with an embodiment of the present invention.
FIG. 7 is a process flow diagram of a method for implementing different routing options with respect to a cloud computing platform in accordance with an embodiment of the present invention.

Referring to FIGS. 6 and 7, routing of requests, such as using the DNS system 400, may be performed to take into the account latency and cost. Referring specifically to FIG. 6, routing options may be grouped into "lanes," including a cost effective lane, fast lane, and performance lane. The cost effective lane avoids ingress locations at cloud POPs 106a-106c and routing of traffic over the cloud backbone 104 inasmuch as there may be additional charges for such usage. The cost effective lane may reduce at the expense of higher latency. The fast lane may include an ingress location at a cloud POP 106a-106c (e.g., the cloud POP 106a-106c closest to the user endpoint 112a generating a request) with intra-cloud traffic being routed over the cloud backbone 104. The fast lane may provide reduced latency at increased cost from utilization of the POPs 106a-106c and cloud backbone 104. The performance lane may provide an intermediate level of latency and cost by using an ingress location other than a cloud POP 106a-106c while still routing intra cloud traffic over the cloud backbone 104.

The lane used may be a user-configurable parameter. For example, a particular application instance 200a may be assigned to a lane such that the intelligent routing module 402 will program the cloud DNS 404 and/or alternative routing logic 406 to route requests to that application instance 200a according to that lane. Application instances may be assigned to lanes individually, as a group (e.g., all instances of the same executable). Lanes may be additionally or alternatively be assigned to users or groups of users. For example, all requests from a user or group may be routed according to a particular lane or a combination. In another example, a particular combination of user and application instance may be assigned to a particular lane.

Referring to FIG. 7, the illustrated method 700 may be used by the intelligent routing module 402 to implement the three lanes, or other number of lanes. If the lane for a user and/or application instance is found 702 to be the cost effective lane, the intelligent routing module 402 configures 704 the fabric to bypass cloud POPs 106a-106c and the cloud backbone 104. For example, for an application instance 200a in a first regional cloud, requests to access the application instance 200a may be routed over the Internet 108 to an ingress point that is not a POP 106a-106c, including requests that are closer to a second regional cloud than to the first regional cloud. This configuration may include assigning an edge cluster 110a in the first regional cloud a static IP address that is not an Anycast IP address. In this manner, traffic addressed to the application instance will be routed to the static IP address over the Internet 108 rather than through a cloud POP 106a-106c or the cloud backbone 104. For example, step 704 may include programming GeoDNS of a cloud computing platform 102 to resolve a domain name to a static IP address for a given location of a user endpoint 112a-112d that results in bypass of POPs 106a-106c of the cloud computing platform 102.

If the lane for a user and/or application instance 200a is found 706 to be the fast lane, the intelligent routing module 402 may configure 708 the fabric such that ingress is performed at a cloud POP 106a-106c with use of the cloud backbone for intra-cloud traffic. This may include associating the name and/or domain of the application instance with an edge cluster 110a located within a cloud POP 106a-106c. The edge cluster 110a may be assigned an Anycast IP address in the cloud DNS 404. In this manner, traffic from user endpoints 112a-112d located nearer to a different regional cloud than that hosting the edge cluster 110a would be routed to a nearest POP 106a-106c and then over the cloud backbone 104 to the POP 106a-106c hosting the edge cluster 110a. User endpoints 112a-112d located nearer to the same regional cloud hosting the edge cluster 110a than other regional clouds of the cloud computing platform, may be routed over the Internet 108 to the POP 106a-106c hosting the edge cluster 110a.

If the lane for a user and/or application instance 200a is the performance lane, the intelligent routing module 402 may configure 710 the fabric such that ingress is performed at a cloud POP 106a-106c without use of the cloud backbone for intra-cloud traffic. This may include associating the name and/or domain of the application instance with an edge cluster 110a located within a cloud POP 106a-106c. The edge cluster 110a may be assigned a static IP address (not Anycast) in the cloud DNS 404. The static IP address may be resolved from a domain name of a request according to the location of a user endpoint 112a-112d that generated the request. The resolution to the static IP address according to user endpoint 112a-112d location may be programmed into the GeoDNS of the cloud computing platform 102.

In this manner, traffic from user endpoints 112*a*-112*d* located nearer to a different regional cloud than that hosting the edge cluster 110*a* would be routed over the Internet 108 to the POP 106*a*-106*c* hosting the edge cluster 110*a* rather than over the cloud backbone 104. User endpoints 112*a*-112*d* located nearer to the same regional cloud hosting the edge cluster 110*a* than other regional clouds of the cloud computing platform, may be routed over the Internet 108 to the POP 106*a*-106*c* hosting the edge cluster 110*a*.

Note that in some instances, the benefit of one of the three lanes relative to another may be small. Accordingly, in some embodiments, a user preference may be overridden and substituted for a lower cost option when this occurs. For example, if a measured or estimated (see estimation techniques described below with respect to FIGS. 12 and 13) latency of a user endpoint 112*a*-112*e* with respect to an application instance 200 for one lane is within a threshold difference (e.g., a predefined number of milliseconds) of the latency for a second lane and the second lane has lower cost, the second lane may be substituted for routing traffic between the user endpoint 112*a*-112*e*.

Figure 8:
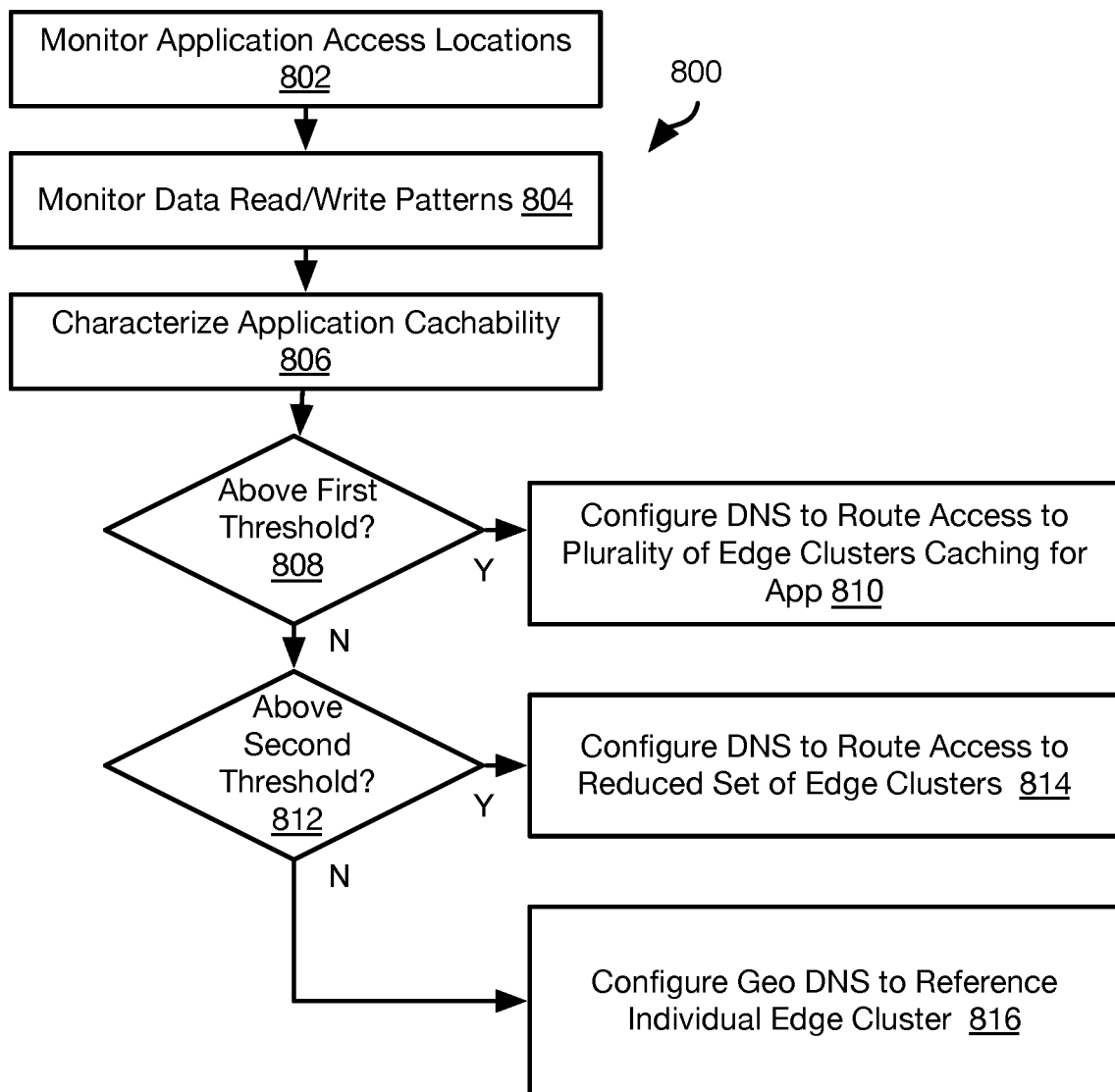
FIG. 8 is a process flow diagram of a method for implementing routing with respect to a cloud computing platform according to cacheability in accordance with an embodiment of the present invention.
Figure 9A:
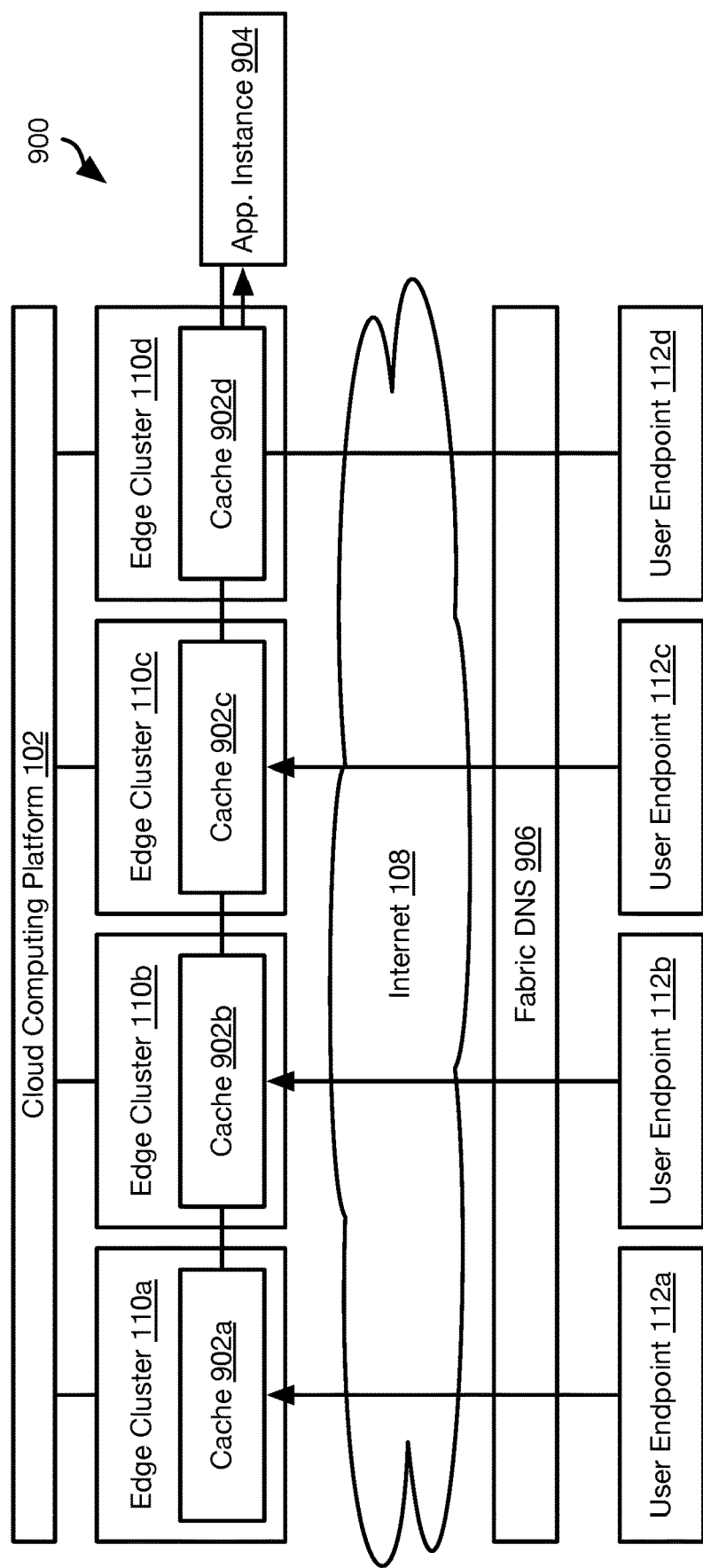
FIGS. 9A and 9B illustrate different routing configurations according to cacheability in accordance with an embodiment of the present invention.
Figure 9B:
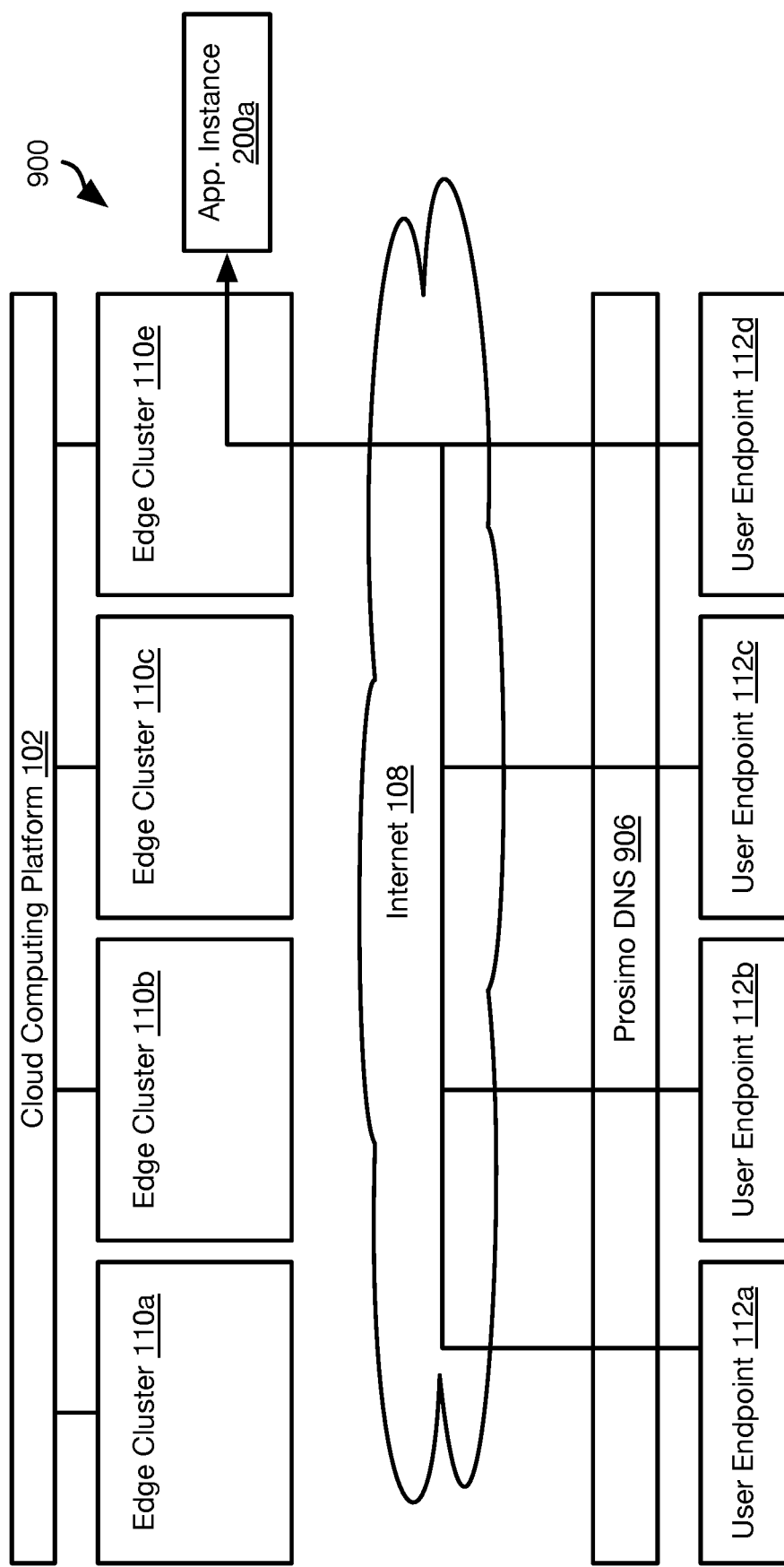

FIGS. 8, 9A, and 9B illustrate an approach for routing traffic for an application instance 200*a* to edge clusters 110*a*-110*e* of a fabric while taking into account cacheability of content provided by that application instance 200*a*.

For example, a method 800 may include monitoring 802 application access locations of user endpoints 112*a*-112*e* accessing the application instance 200*a*. The location of an endpoint 112*a*-112*d* at a time of generation of a request may be obtained by: inferring a location from a source IP address of the request, reading the location from a header included in the request, reading the location from an explicitly provided location value provided by the endpoint 112*a*-112*d* within the request. Monitoring 802 the locations may include some or all of compiling statistics for each location represented in received requests at varying degrees of specificity: requests from a country, from each state or province within the country, from each metropolitan area within the country, within each city within the country, etc. Statistics may be in the form of a frequency of requests (requests per day, hour, minute, or other time window) over time.

The method 800 may further include monitoring 804 data read and write patterns 804. This may include monitoring a cache for the application instance. Monitoring read and write patterns 804 may include monitoring a rate at which entries in a cache are overwritten or marked as invalid by the application 200*a*. Monitoring read and write patterns 804 may include inspecting requests and compiling statistics regarding the number of read requests and write requests, e.g. a number of write requests within a time window (e.g., every day, hour, minute, etc.) and a number of read requests within the time window sampled periodically over time. Step 804 may include calculating a ratio of these values over time, e.g., a ratio of reads per writes over time or within a time window preceding a time of calculation of the ratio.

The method 800 may include characterizing 806 the cacheability of the application. This may include evaluating such factors as the ratio of reads per writes (a higher ratio of reads means higher cacheability) and labeling of data provided by the application in response to requests (e.g., whether the data is flagged as cacheable, a time to live (TTL) of the data). A cacheability score may be calculated as a function of these factors (a sum, weighted sum, etc.) and compared to one or more thresholds. For example, if the cacheability score is found 808 to be above a first threshold (highly cacheable), the intelligent routing module 402 may program the cloud DNS 404 and intelligent routing module to route access to the application 200*a* through a plurality of edge clusters 110*a*-110*e*. For example, the name and/or domain of the application 200*a* may be mapped to an Anycast IP address associated with the plurality of edge clusters 110*a*-110*e*. Accordingly, requests from each user endpoint 112*a*-112*d* will be routed to the edge cluster 110*a*-110*e* closest to it, which will have a high likelihood of having requested data to the cacheability of the application instance 200*a*.

In some embodiments, if the cacheability is found 812 to be below the first threshold but above a second threshold, step 814 is performed, which may be the same as step 810 but for a reduced number of edge clusters 110*a*-110*e*. For example, the set of edge clusters 110*a*-110*e* associated with the Anycast IP address may be limited to those closest to the application instance 200*a* relative to those edge clusters 110*a*-110*e* that are excluded. In some embodiments, a single threshold is used such that steps 812 and 814 are not performed.

If the cacheability is not found to meet a threshold condition (below the first threshold or below multiple thresholds), then the method 800 may include the intelligent routing module 402 configuring 816 the cloud DNS 404 and/or alternative routing logic 406 such that traffic from each user endpoint 112*a*-112*e* and addressed to the application instance 200*a* will be routed to a single edge cluster 110*a*, e.g. the edge cluster 110*a* closest to the application instance 200*a* or at least in the same regional cloud or the same POP 106*a*-106*c* as the application instance 200*a*. This routing may be according to any of the three lanes described above (cost effective, fast lane, performance) such that traffic may be routed through POPs 106*a*-106*c* and the cloud backbone 104 (fast lane), through a POP 106*a* closest to the edge cluster 110*a* but not the cloud backbone 104 (performance), or through an ingress location without using a POP 106*a* or the cloud backbone 104 (cost effective).

For example, to achieve the fast lane, the cloud DNS 404 may be configured such that edge cluster 110*a* is the only edge cluster associated with an Anycast IP address. Accordingly, all requests addressed to that IP address will be routed by the cloud DNS 404 through a POP 106*a*-106*c* closest to the source of the request and through the cloud backbone 104 to the edge cluster 110*a*.

FIG. 9A illustrates the case 900 of a highly cacheable application instance 200*a* that is located close to edge cluster 110*d* (e.g., same POP 106*a*-106*c* or same regional cloud). A plurality of edge clusters 110*a*-110*d* may include caches 902*a*-902*d*. Data from responses to requests transmitted from the application instance 904 may be cached in the caches 902*a*-902*d*. The manner in which data is cached, cache hits are identified, and the caches 902*a*-902*d* are maintained may be according to any approach known in the art for implementing a cache, such as approaches for caching responses to HTTP content.

A fabric DNS 906 may be a combination of the cloud DNS 404, the intelligent routing module 402, and any alternate routing logic relating to access of the application instance 200*a* as described above. As is apparent the fabric DNS 906 in the highly cacheable case is configured to route requests to a plurality of edge clusters 110*a*-110*e*, such as to the edge cluster 110*a*-110*e* nearest to the endpoint 112*a*-112*d* that originated the request. Accordingly, if a response to the request is cached, that nearest edge cluster 110*a*-110*e* may provide the response without waiting for the application instance 200*a*.

FIG. 9B illustrates a non-cacheable case in which the fabric DNS 906 is configured to route requests directly to the edge cluster 110e, such as the edge cluster 110e nearest to the application instance 200a. FIG. 9B illustrates the case where traffic is routed to edge cluster 110e over the Internet 108, i.e., the cost effective lane. In other instances, the traffic could be routed over the cloud backbone 104 to implement the fast lane.

Figure 10:
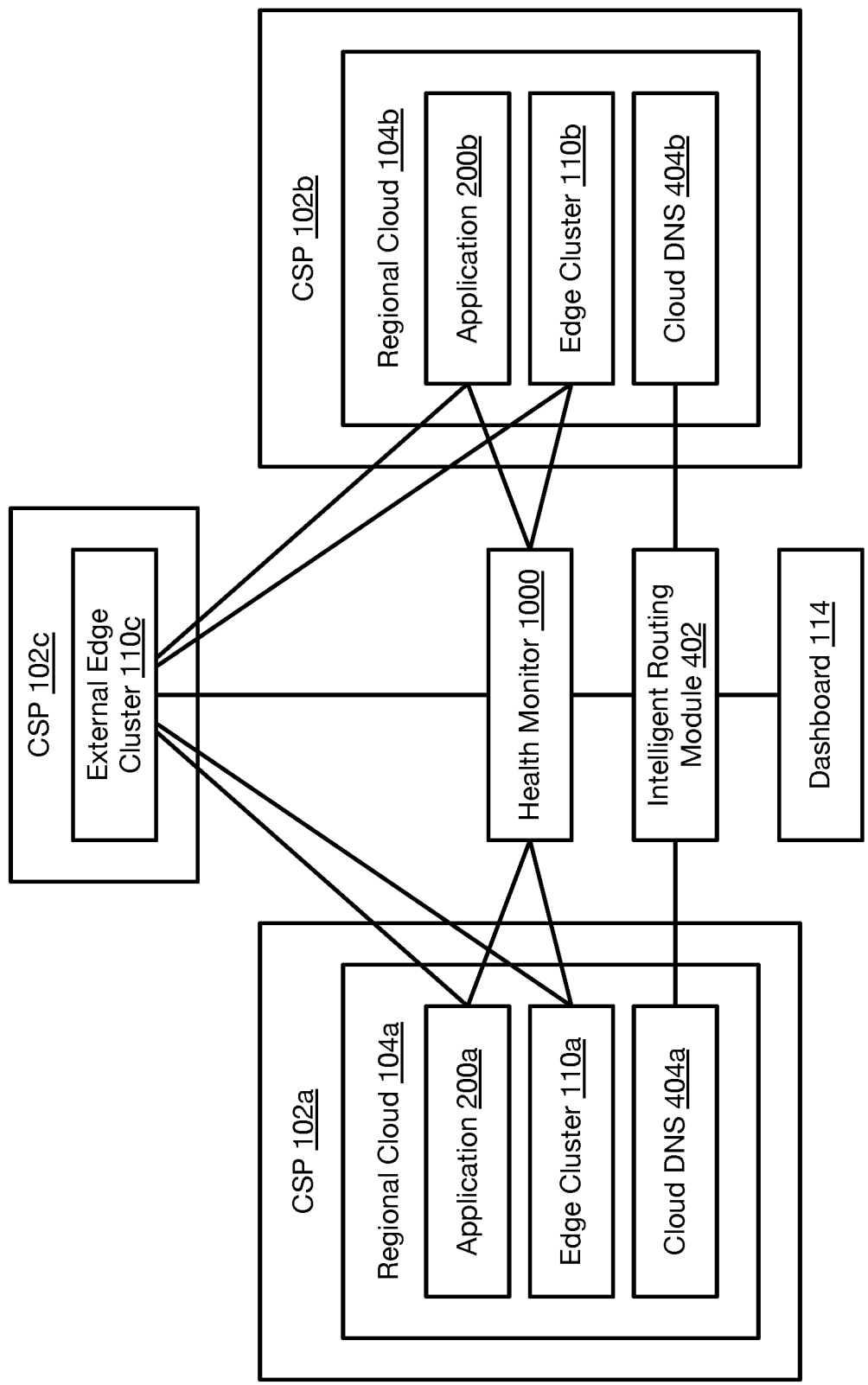
FIG. 10 is a schematic block diagram of components for performing backup and restoration in accordance with an embodiment of the present invention.

FIG. 10 illustrates an approach for implementing the backup and restoration of a application instance 200a and an application instance 200b. The application instances 200a, 200b may be instances of the same executable image or otherwise be capable of performing the same functions. The application instance 200b may be a backup (i.e., secondary application instance) to the application instance 200a (i.e., primary application instance). In the following description, a single secondary application instance is described with the understanding that there may be multiple secondary application instances that may be monitored and used for restoration in the same manner.

To reduce the risk of failure of a regional cloud 104a, 104b or access to a regional cloud 104b, the application instance 200a may be located within a regional cloud 104a of a CSP 102a while the application instance 200b may be located within a different regional cloud 104b of either the same CSP 102a or a different CPS 102b.

Each application instance 200a, 200b may be accessible by a single edge cluster 110a or different edge clusters 110a, 110b, respectively, such as edge clusters 110a, 110b hosted by the same regional clouds 104a, 104b as the application instances 200a, 200b. Each regional cloud 104a, 104b may implement a cloud DNS 404a, 404b performing some or all of the functions of a cloud DNS 404 as described above.

A health monitor 1000 may be executed with respect to the application instances 200a, 200b. The health monitor 1000 may be used to detect unavailability of the application instances 200a, 200b due to failure of the application instances 200a, 200b themselves or failure of a regional cloud 104a, 104b, could service provider 102a, 102b, or a network used to access the regional clouds 104a, 104b. Accordingly, the health monitor 1000 may advantageously execute on a computer system that is separate from any regional cloud 104a, 104b and/or cloud service provider 102a, 102b hosting the application instances 200a, 200b, such as on-premise computing equipment of an entity controlling the application instances 200a, 200b or a different cloud service provider. The health monitor 1000, CSP 102a, and CSP 102b may be connected to one another by a wide area network (WAN), such as the Internet or other network.

The health monitor 1000 may detect failure of application instance 200a that is currently the primary application instance and manage failover to the current secondary application instance 200b according to the methods described below. To that end, the health monitor 1000 may interact with the intelligent routing module 402 in order to redirect traffic from the application instance 200a to the application instance 200b as the new primary application instance as described below. A user may view the current status of the application instances 200a, 200b as well as health monitoring statistics (e.g., latency, results of health checks, etc.) using the dashboard 114. In particular, each time the status of the application instances 200a, 200b changes (unavailable, switched to primary, switched to secondary), this information may be presented on the dashboard 114.

In some instances, the health monitor 1000 may test accessibility of the application instances 200a, 200b from outside of the regional clouds 104a, 104b and/or the CSPs 102a, 102b. Accordingly, the health monitor 1000 may interact with a component, such as another edge cluster 110c executing in a third CSP 102c connected to the WAN and/or third regional cloud 104c. The health monitor 1000 may perform performance of tests with respect to the application instances 200a, 200b by the edge cluster 110c, such as pings, measuring latency, performing health checks, or other checks.

Figure 11:
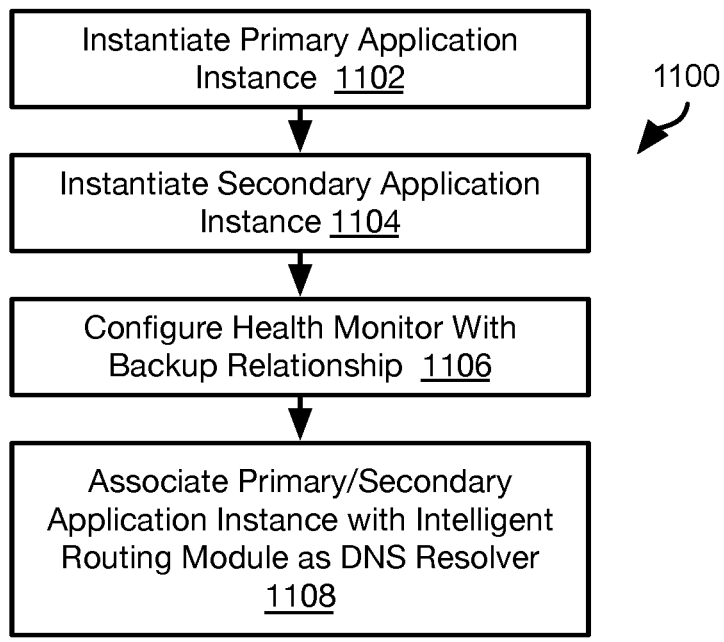
FIG. 11 is a process flow diagram of a method for setting up backup and restoration for application instances in accordance with an embodiment of the present invention.

Referring to FIG. 11, the illustrated method 1100 may be executed in order to configure a backup and restore relationship between the application instance 200a and the application instance 200b. The method 1100 may be executed under the control of the dashboard 114 or some other component executing in any of the cloud computing platforms 102a, 102b, 102c or a different computing device.

The method 1100 includes instantiating 1102 the application instance 200a in the regional cloud 104a of the CSP 102a and instantiating 1104 the application instance 200b in the regional cloud 104b of the CSP 102b. As noted above, each application instance 200a, 200b may be an instance of the same executable.

The method 1100 may include configuring 1106 the health monitor 1000 with a backup relationship between the application instances 200a, 200b. For example, the backup relationship may be represented by a data structure including some or all of identifiers of the application instances 200a, 200b, IP addresses of the application instances 200a, 200b, and an indication that the application instance 200a is currently primary and that the application instance 200b is secondary. The data structure may further identify the CSP 102a, 102b and regional clouds 104a, 104b hosting each application instance 200a, 200b, respectively.

The method 1100 may further include associating 1108 the application instance 200a with the intelligent routing module 402 as the DNS server for the application instance 200. Likewise, step 1108 includes associating the application instance 200b with the intelligent routing module 402 as the DNS server for the primary application instance 200. For example, step 1108 may include associating a domain name assigned to each application instance 200a, 200b with the intelligent routing module 402. Accordingly, requests to resolve the domain names of the application instances 200a, 200b will be resolved by the intelligent routing module 402. For example, the intelligent routing module 402 may resolve the requests to resolve the domain names of the application instances 200a, 200b using the approach described above with respect to FIGS. 3 to 5 with further modification as described in greater detail below with respect to FIG. 13.

Figure 12:
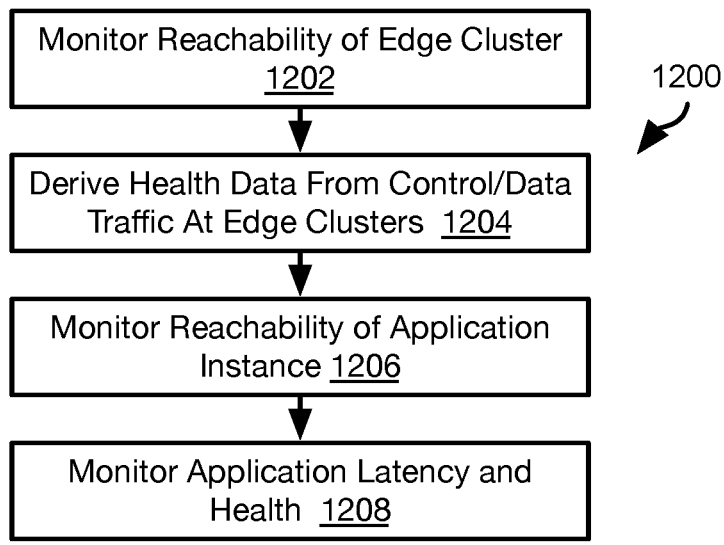
FIG. 12 is a process flow diagram of a method for monitoring function of primary and secondary application instances in accordance with an embodiment of the present invention.

FIG. 12 illustrates a method 1200 for monitoring the application instances 200a, 200b. The method 1200 may be performed under control of the health monitor 1000 in response to backup relationship being created between the application instances 200a, 200b according to the method 1100.

The method 1200 may include monitoring 1202 reachability of one or more edge clusters 110a, 110b through which the application instances 200a, 200b may be accessed. Monitoring 1202 reachability may include sending a ping or other message to the edge clusters from an edge cluster 110c or other component that is external to one or both of (a) any of the regional clouds 104a, 104b hosting the application instances 200a, 200b and (b) any of the CSPs 102a, 102b hosting the application instances 200a, 200b. Step 1202 may include monitoring accessibility between multiple locations and the regional clouds 104a, 104b and/or CSPs 102a, 102b.

The method 1200 may further include deriving 1204 health data from control and/or data traffic at any edge clusters 110a, 110b through which the current primary application instance 200a is accessed. The current secondary application instance 200b may remain unused and inaccessible while the application instance 200a is the primary application instance. Accordingly, step 1204 may be performed without involvement of the current secondary application instance 200b. Alternatively, simulated data traffic and/or control traffic may be generated by the health monitor 1000 or other component and transmitted to the current secondary application instance 200b in order to assess functionality of the application instance 200b and any edge cluster 110b through which the application 200b would be accessible if made primary.

Health data may be derived from the data and/or control traffic by detecting signs of failure, such as error messages or timing out of requests. The health data may be derived in the form of statistics for the data and/or control traffic, e.g., latency between forwarding traffic from the edge cluster 110a to the current primary application instance 200a and the time that responses to the traffic are received, a number of packets per unit time that are sent and received over each network connection to the current primary application instance 200a by way of the edge cluster 110a, or other metric.

The method 1200 may include monitoring 1206 reachability of each application instance 200a, 200b. Inasmuch as reachability of the edge clusters 110a, 110b through which the application instances 200a, 200b are accessed may be independently assessed at step 1204, step 1206 may include monitoring accessibility between an edge cluster 110a, 110b through which the application instance 200a, 200b accessed by way of the edge cluster 110a, 110b. Accordingly, step 1206 may include sending a ping or other request from the edge cluster 110a, 110b to the application instance 200a, 200b, respectively, receiving a response to the ping or other request, and forwarding the response (or data derived therefrom) to the health monitor 1000. In some embodiments, the health monitor 1000 may generate the ping or other request and send the ping or other request to the application instance 200a, 200b by way of the edge cluster 110a, 110b through which the application instance 200a, 200b is accessed and receive any response through this same path.

The method 1200 may include directly monitoring 1208 health and latency of the application instances 200a, 200b. For example, step 1208 may include receiving, by the health monitor 1000, the result of tests of one or both of the health and latency of the application instances 200a, 200b as performed by the application instances 200a, 200b. For example, step 1208 may include receiving log data generated by the application instances 200a, 200b themselves. In some embodiments, the health monitor 1000 may transmit instructions to the application instances 200a, 200b to perform tests of one or both of health and latency and return the result to the health monitor 1000. In some embodiments, the edge cluster 110a,110b through an application instance 200a, 200b is accessed may transmit instructions to the application instances 200a, 200b to perform tests of one or both of health and latency and return the result to the health monitor 1000 directly or by way of the edge cluster 110a, 110b forwarding the result of the health and/or latency check to the health monitor 100.

Figure 13:
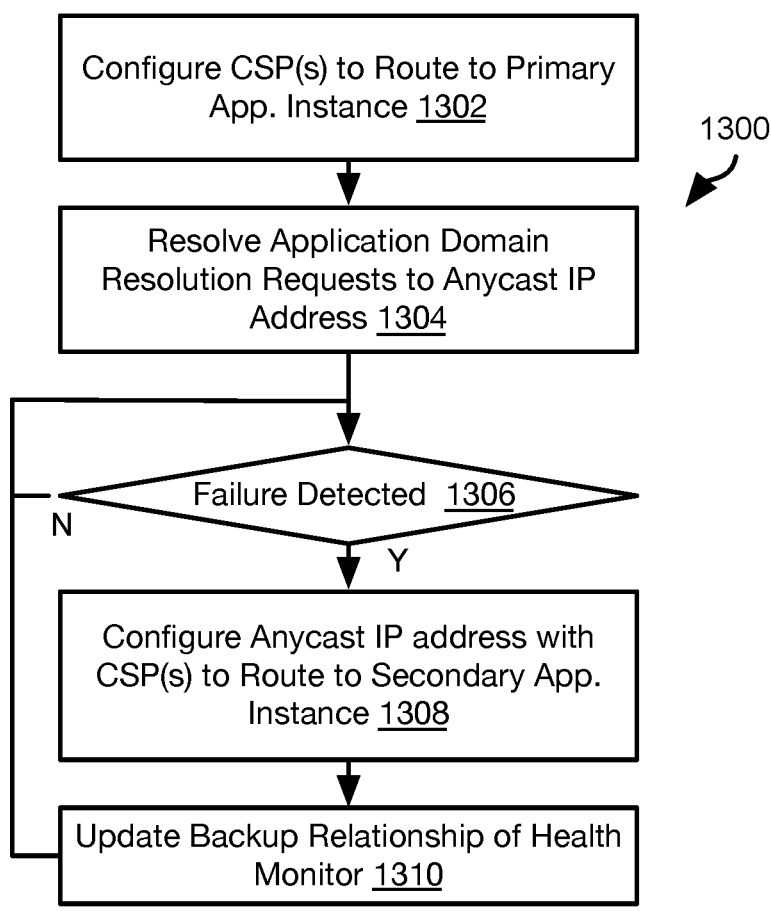
FIG. 13 is a process flow diagram of a method for performing failover between primary and secondary application instances in accordance with an embodiment of the present invention.

FIG. 13 illustrates a method 1300 that may be executed by the health monitor 1000. The method 1300 may include configuring 1302 the CSP 102a hosting the current primary application instance 200a, e.g., the cloud DNS 404a, according to the backup relationship received according to the method 1100. Step 1302 may be performed by way of the intelligent routing module 402.

Step 1302 may include configuring a geo DNS of the cloud DNS 404a to resolve requests to resolve the domain name of the current primary application instance 200a to an IP address of the edge cluster 110a through which the current primary application instance 200a is accessed as described above with respect to FIG. 5.

Step 1302 may additionally or alternatively include configuring an Anycast IP address, which may be the IP address to which the domain name of the current primary application instance 200a (which may be the same as that of the current secondary application instance 200a) is resolved. For example, a same Anycast IP address may be associated with both of the edge clusters 110a, 110b or only whichever of the edge clusters 110a, 110b is used to access the current primary application instance.

The traffic addressed to the Anycast IP may be routed by a given CSP 102a, 102b to other edge clusters based on the location of a source of traffic without regard to the functionality described below with respect to the edge clusters 110a, 110b. For example, for a given geographic region, traffic from the region and addressed to the Anycast IP address may be routed to one of the edge clusters 110a, 110b as described below. Traffic from other geographic regions addressed to the same Anycast IP address may be routed to different edge clusters without regard to the current routing for the edge clusters 110a, 110b.

The edge clusters 110a may be configured to route traffic addressed to the Anycast IP address to the application instances 200a as described above with respect to FIG. 5, which may include forwarding the traffic to a second IP address assigned to the current primary application instance 200a. The cloud DNS 404a may be configured to route traffic addressed to the Anycast IP address to the edge cluster 110a. The cloud DNS 404b of the CSP 102b may also be configured to route traffic addressed to the Anycast IP address to the edge cluster 110a. Alternatively, the cloud DNS 404b of the CSP 102b may be configured to route traffic addressed to the Anycast IP address to the edge cluster 110b, which then forwards the traffic to the edge cluster 110a, such as using alternative routing logic as described above.

Note that if the edge clusters 110a, 110b are in the same CSP 102a, the cloud DNS 404b may be configured to route traffic addressed to the Anycast IP address to the edge cluster 110a rather than to the edge cluster 110b. In some instances, step 1302 may include configuring the cloud DNS 404b of multiple regional clouds 104a of the same CSP 102a may be configured to route traffic addressed to the Anycast IP address to the edge cluster 110a rather than to the edge cluster 110b.

The method 1300 may include receiving, by the cloud DNS 404a and/or cloud DNS 404b, a request to resolve the domain name of the primary application instance 200a. The cloud DNS 404a and/or cloud DNS 404b may resolve 1304 the domain name to the Anycast IP address described above. Thereafter, the source of the request to resolve the domain name may transmit traffic addressed to the Anycast IP address, which is then routed by the CSP 102a to the edge cluster 110a and by the edge cluster 110a to the primary application instance 200a. The application 200a will then process the traffic and transmit any return traffic to the source of the traffic, such as by way of the edge cluster 110a.

As the application instance 200a processes the traffic, the health monitor 1000 may monitor the health and accessibility of the application instance 200a and possibly the application instance 200b, such as according to the method 1200 described above.

The method 1300 may include evaluating 1306 whether failure is detected. Failure may be detected in any of the monitoring steps of the method 1200. For example, step 1306 may include detecting that the edge cluster 110*a* is unreachable at step 1202, determining that the control and/or data traffic at the edge cluster 110*a* indicates an error at step 1204, determining that the current primary application instance 200*a* is not reachable at step 1206, determining that the health checks and/or latency from step 1208 indicate an error, or some other indication of failure of unreachability of the application instance 200*a*.

Step 1306 may include both determining that the current primary application instance 200*a* has failed or is inaccessible and that the current secondary application instance 200*b* remains functional and accessible. Where there are multiple secondary application instances 200*b*, step 1306 may include determining that at least one of the secondary application instances 200*b* is available and functioning and selecting one of the accessible and functioning secondary application instances 200*b*.

If the condition of step 1306 is met, the method 1300 may include configuring 1308 routing logic one or both of the CSPs 102*a*, 102*b* such that traffic addressed to the Anycast IP address (see step 1304) will be routed to the edge cluster 110*b*, which will then forward the traffic to the new primary application instance 200*b*. Step 1308 may include configuring the cloud DNS 404*a*, 404*b* of one or both CSPs 102*a*, 102*b* or otherwise configuring the routing logic of the CSPs 102*a*, 102*b*. Step 1308 may include configuring the routing logic of one or both of the CSPs 102*a*, 102*b* to disable or otherwise prevent routing of traffic addressed to the Anycast IP address to the edge cluster 110*a*. Alternatively, alternative routing logic of the edge cluster 110*a* may be configured to route traffic addressed to the Anycast IP address to the edge cluster 110*b* for forwarding to the new primary application instance 200*b*.

The method 1300 may further include updating 1310 the backup relationship recorded by the health monitor 1000. For example, step 1310 may include updating the backup relationship to indicate that the application instance 200*b* is now the primary instance and the status of application instance 200*a*, i.e., how the application instance is or is not accessible (e.g., CSP not accessible, application instance 200*a* failed, etc.) and the current health and/or latency of the application instance 200*a*.

Following steps 1308 and 1310, the application instance 200*b* is the primary application instance. The application instance 200*b* will then process the traffic addressed to the Anycast IP and transmit any return traffic to the source of the traffic, such as by way of the edge cluster 110*b*. Subsequent to step 1308, the methods described herein, including the methods 1100, 1200, and 1300 may be performed with the application instance 200*b* and edge cluster 110*b* taking the place of the application instance 200*a* and the edge cluster 110*a*. When the application instance 200*a* becomes accessible and functional, the application instance 200*a* may function as a secondary application instance accessible through edge cluster 110*b* as described above.

In some embodiments, when the original primary application instance 200*a* becomes accessible and functional, the health monitor 1000 may invoke transitioning back to the application instance 200*a* functioning as the primary instance and the application instance 200*b* functioning as the secondary instance. Transitioning may include configuring the routing logic of one or more CSPs as described with respect to step 1302 as well as updating the backup relationship of the health monitor 1000 to indicate the current roles of the application instances 200*a*, 200*b*. Where there are multiple secondary application instances 200*b*, those secondary application instances 200*b* that are not selected to become the primary instance may continue to function as secondary application instances following step 1308.

Figure 14:
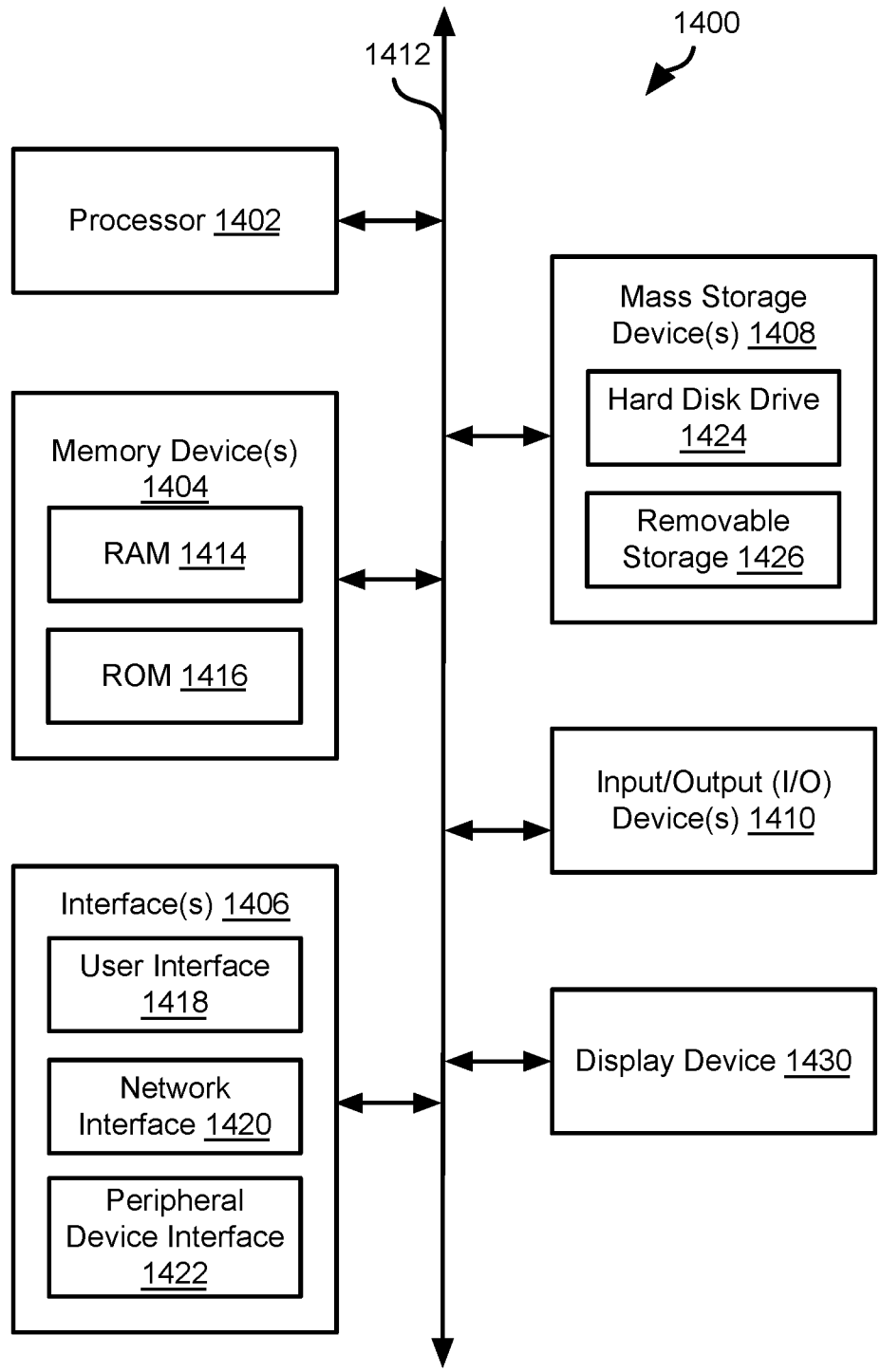
FIG. 14 is a schematic block diagram of a computing device that may be used to implement the systems and methods described herein.

FIG. 14 illustrates an example computing device 1400 that may be used to implement a cloud computing platform or any other computing devices described above. In particular, components described above as being a computer or a computing device may have some or all of the attributes of the computing device 1400 of FIG. 14. FIG. 14 is a block diagram illustrating an example computing device 1400 which can be used to implement the systems and methods disclosed herein.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   instantiating a plurality of edge clusters on one or more cloud computing platforms, the one or more cloud computing platforms connected to a wide area network (WAN);
   instantiating a first application instance in the one or more cloud computing platforms and configuring a first edge cluster of the plurality of edge clusters to enable access to the first application instance, the first edge cluster executing in a first point of presence (POP) of the one or more cloud computing platforms and configured to control authentication and access to the first application instance executing within the one or more cloud computing platforms;
   instantiating a second application instance in the one or more cloud computing platforms and configuring a second edge cluster of the plurality of edge clusters to enable access to the second application instance, the second edge cluster executing in a second POP of the one or more cloud computing platforms and configured to control authentication and access to the second application instance executing within the one or more cloud computing platforms;
   creating, by a computing device external to the one or more cloud computing platforms and connected to the one or more cloud computing platforms by the WAN, a backup relationship between the first application instance and the second application instance;
   (a) monitoring, by the computing device, accessibility of the first application instance externally from the one or more cloud computing platforms;
   programming, by the computing device, routing logic of the one or more cloud computing platforms to route first network traffic addressed to a first address to the first edge cluster, the first edge cluster being configured to route the first network traffic from the first POP to the first application instance in the one or more cloud computing platforms;
   (b) detecting, by the computing device, unavailability of the first application instance according to (a); and
   in response to (b), programming, by the computing device, the routing logic of the one or more cloud computing platforms to route second network traffic addressed to the first address to the second edge cluster, the second edge cluster being configured to route the second network traffic from the second POP to the second application instance in the one or more cloud computing platforms.

2. The method of claim 1, wherein programming the routing logic of the one or more cloud computing platforms comprises:
   programming a geographic domain name service (GeoDNS) of the one or more cloud computing platforms to resolve a domain name associated with the first application instance and the second application instance to the first address.

3. The method of claim 2, wherein the first address is an Anycast internet protocol (IP) address.

4. The method of claim 3, further comprising forwarding, by the first edge cluster, the first network traffic to a second address that is different from the Anycast IP address.

5. The method of claim 1, wherein the first application instance executes in a first regional cloud of the one or more cloud computing platforms and the second application instance executes in a second regional cloud of the one or more cloud computing platforms.

6. The method of claim 1, wherein the first application instance executes in a first cloud computing platform of the one or more cloud computing platforms and the second application instance executes in a second cloud computing platform of the one or more cloud computing platforms.

7. The method of claim 1, wherein (a) comprises performing at least one of a health check and a latency check with respect to the first application instance.

8. The method of claim 1, wherein (a) comprises monitoring, by the computing device, accessibility of the second application instance externally from the one or more cloud computing platforms.

9. The method of claim 1, wherein (a) comprises monitoring, by the computing device, accessibility of the first application instance from a cloud computing platform that is not one of the one or more cloud computing platforms.

10. The method of claim 1, wherein (a) comprises monitoring, by the computing device, accessibility of the first application instance from the first edge cluster.

11. A system comprising:
    one or more cloud computing platforms connected to a wide area network (WAN);
    a plurality of edge clusters executing on the one or more cloud computing platforms;
    a first application instance executing in the one or more cloud computing platforms, a first edge cluster of the plurality of edge clusters configured to enable access to the first application instance, the first edge cluster executing in a first point of presence (POP) of the one or more cloud computing platforms and configured to control authentication and access to the first application instance executing within the one or more cloud computing platforms;
    a second application instance executing in the one or more cloud computing platforms, a second edge cluster of the plurality of edge clusters configured to enable access to the second application instance, the second edge cluster executing in a second POP of the one or more cloud computing platforms and configured to control authentication and access to the second application instance executing within the one or more cloud computing platforms; and
    a computing device external to the one or more cloud computing platforms, the computing device configured to:

implement a backup relationship between the first application instance and the second application instance by:
- (a) monitoring accessibility of the first application instance externally from the one or more cloud computing platforms;
- programming routing logic of the one or more cloud computing platforms to route first network traffic addressed to a first address to the first edge cluster, the first edge cluster being configured to route the first network traffic from the first POP to the first application instance in the one or more cloud computing platforms;
- (b) detecting unavailability of the first application instance according to (a); and
- in response to (b), programming the routing logic of the one or more cloud computing platforms to route second network traffic addressed to the first address to the second edge cluster, the second edge cluster being configured to route the second network traffic from the second POP to the second application instance in the one or more cloud computing platforms.

12. The system of claim 11, wherein the computing device is configured to program the routing logic of the one or more cloud computing platforms by:
- programming a geographic domain name service (GeoDNS) of the one or more cloud computing platforms to resolve a domain name associated with the first application instance and the second application instance to the first address.

13. The system of claim 12, wherein the first address is an Anycast internet protocol (IP) address.

14. The system of claim 13, wherein the first edge cluster is configured to forward the first network traffic to a second address that is different from the Anycast IP address.

15. The system of claim 11, wherein the first application instance executes in a first regional cloud of the one or more cloud computing platforms and the second application instance executes in a second regional cloud of the one or more cloud computing platforms.

16. The system of claim 11, wherein the first application instance executes in a first cloud computing platform of the one or more cloud computing platforms and the second application instance executes in a second cloud computing platform of the one or more cloud computing platforms.

17. The system of claim 11, wherein the computing device is configured to perform (a) by performing at least one of a health check and a latency check with respect to the first application instance.

18. The system of claim 11, wherein the computing device is configured to perform (a) by monitoring accessibility of the second application instance externally from the one or more cloud computing platforms.

19. The system of claim 11, wherein the computing device is configured to perform (a) by monitoring accessibility of the first application instance from a cloud computing platform that is not one of the one or more cloud computing platforms.

20. The system of claim 11, wherein the computing device is configured to perform (a) by monitoring accessibility of the first application instance from the first edge cluster.

* * * * *